July 14, 1942.　　　A. MAXTON　　　2,289,669
PROCESS AND APPARATUS FOR USE IN THE PURIFICATION OF LIQUIDS
Filed Oct. 17, 1939
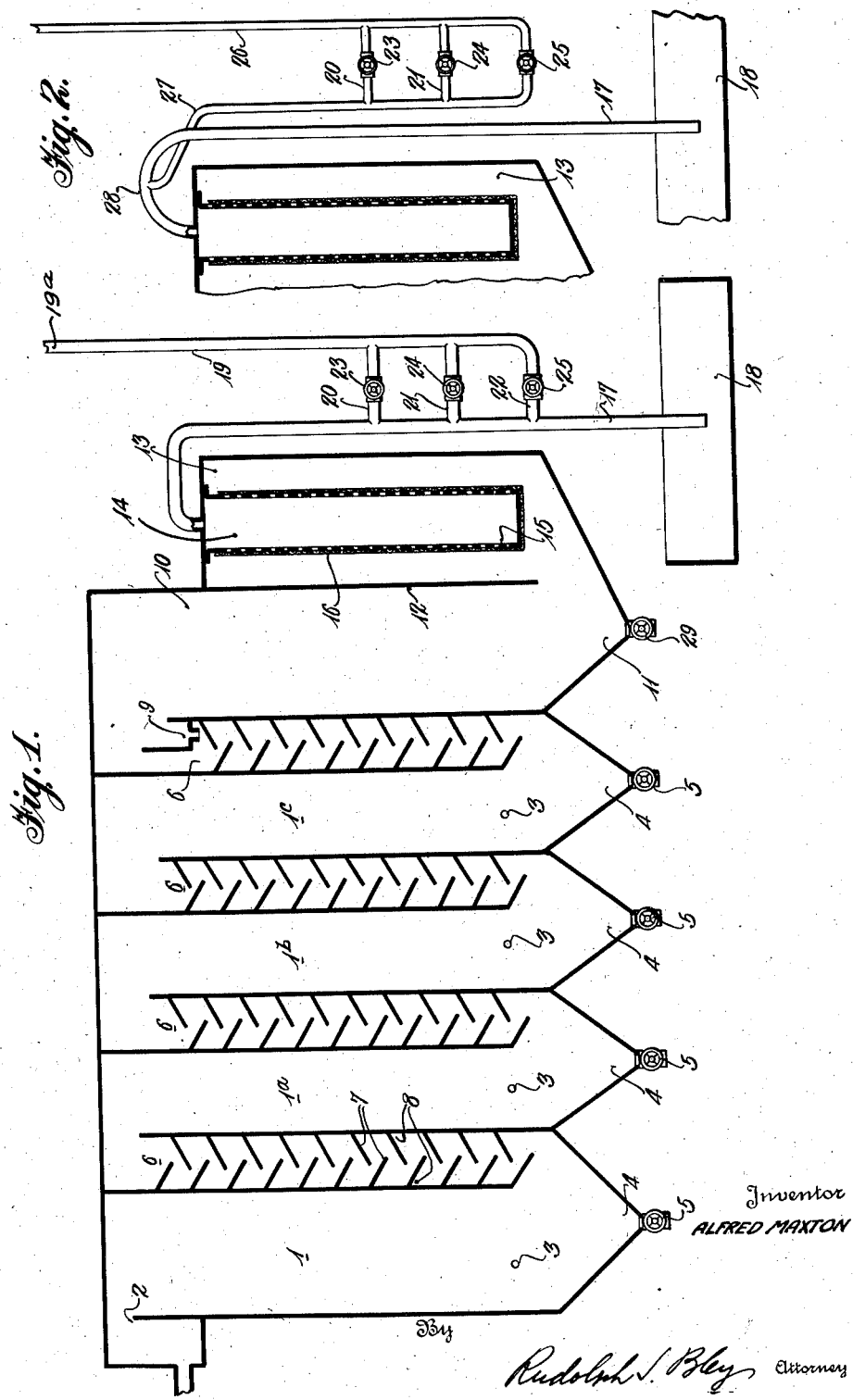

Patented July 14, 1942

2,289,669

UNITED STATES PATENT OFFICE 2,289,669

PROCESS AND APPARATUS FOR USE IN THE PURIFICATION OF LIQUIDS

Alfred Maxton, Heinsberg, Rhineland, Germany, assignor to North American Rayon Corporation, New York, N. Y., a corporation of Delaware Application October 17, 1939, Serial No. 299,828
In Germany September 16, 1938

4 Claims. (Cl. 210—43)

This invention relates to the purification of liquids and more particularly to a method and apparatus for use in the removal of particles finely suspended in such liquids.

The filtration of liquids containing finely suspended particles has hitherto been carried out by various means and methods. In some instances use has been made of simple, solid filters while in other instances filters composed of small solid particles have been employed. The latter filters usually consist of a wide meshed or coarsely grained filter bed on which a fine-fibered or fine-grained layer is deposited, or sometimes even the particles filtered from the liquid and deposited on the filter bed are used as the filtering layer. Use has also been made of filter presses provided with different types of filter cloths and linings. Furthermore, cell filters, settling vats and the like have been employed.

Although these devices have given satisfactory results for ordinary filtering purposes, they are not very suitable in certain instances. For example, when filtering liquids containing minute sulphur particles such as those occurring during the acidification of solutions capable of splitting off sulphur, the known methods of filtration possess certain drawbacks.

Experiments have shown that it is necessary, in order to obtain satisfactory results, to consider the peculiar behavior of the sulphur particles during the filtering operation. It has been found that different varieties of these suspensions, such as, for example, the aforementioned sulphur suspension, have a tendency in the course of time to agglomerate in a peculiar manner. In accordance with the present invention, it has been recognized that advantageous results will be obtained if means are provided which further this particular tendency to agglomerate as much as possible.

It is therefore one object of the present invention to provide a novel method and means for use in the purification of liquids which further the agglomeration of the particles finely suspended therein.

Another object of the present invention is to provide a method and apparatus for the efficient purification of liquids containing suspensions in finely dispersed form.

Still another object is to provide a method and means for the expeditious and economic removal of particles suspended in liquids.

A further object of the present invention is to provide a novel method and means for the periodic removal of particles deposited on the filtering device used in the final filtration of the liquid.

These and other objects will in part become apparent and in part be pointed out in the following specification when studied in conjunction with the accompanying drawing.

In accordance with the present invention the liquid containing the suspensions is first led into a settling chamber where it is caused to flow slowly from above to below. During this passage the particles in the liquid receive their first opportunity to agglomerate. In order to further this agglomeration, compressed air in finely dispersed form is introduced into the lower part of the settling chamber and forced upwardly against the flow of the liquid. The bottom of the settling chamber is V-shaped and provided with discharge devices for the accumulated suspension particles.

In order to bring about the agglomeration of those particles in the liquid which have not been removed therefrom during its down-flow in the chamber, the liquid is caused to flow upwardly at increased speed through a narrow shaft which is provided with baffle plates. Due to the impingement of the particles suspended in the liquid upon these baffle plates, these particles are caused to combine with one another and thus become sufficiently large to drop into the V-shaped bottom. The agglomeration of the suspended particles is further promoted if the baffle plates are arranged in a position which is inclined against the direction of flow of the liquid so that pockets are formed between the baffle plates and the wall of the chamber in which the agglomeration of the particles may take place. Owing to the arrangement of the baffle plates on opposite faces of the shaft, a zigzag-like flow of the liquid through the shaft is produced, while due to the small width of the shaft a rather rapid flow is obtained. On passing into a subsequent settling chamber, however, the liquid flow suddenly decreases in speed, thus again promoting the agglomeration and settling of the particles. A number of settling chambers as described above may be arranged in series. Their advantages are easily understood if it is considered that they possess no movable parts, that means are provided which further the agglomeration of the suspended particles, and that the suspended particles automatically collect in the V-shaped chamber bottom.

Although through the employment of the method and apparatus described above a great portion of the suspension is caused to settle through agglomeration and sedimentation, experiments have shown that not all of the suspended particles in the liquid are removed therefrom. The present invention therefore provides a special filtering device through which the remaining removable particles are filtered off. This device is arranged as follows. To the lower end of the last settling chamber is connected an auxiliary chamber in which a bag-like cloth filter is suspended. The liquid passes through this filter in upward direction. The top plate of the auxiliary chamber is connected to a syphon pipe through which the filtered liquid is removed from the chamber. A stand-pipe having a free open end is connected to the syphon pipe by means of a plurality of cross-pipes provided with stop valves; the cross-pipes being arranged at different elevations with respect to the filtering device. This arrangement makes it possible to control the extent of discharge of liquid from the last settling chamber. Furthermore, owing to the unique connection of the syphon pipe with the standpipe a periodic cleansing of the filtering device may be easily effected.

In the accompanying drawing, which forms a part of this specification, and in which like numerals are employed to designate like parts throughout the same, Fig. 1 is a diagrammatic longitudinal section of a treating apparatus which may be used in carrying out the process of the present invention, and Fig. 2 is a diagrammatic showing of a modification of the standpipe disclosed in Fig. 1.

In the drawing, 1, 1a, 1b and 1c represent settling chambers. The chamber 1 is provided with an overflow 2. The liquid which is to be purified enters the chamber 1 through this overflow and flows slowly downwardly within the chamber. In the lower part of each of the chambers 1, 1a, 1b and 1c is arranged a nozzle 3 for the injection of compressed air into the chambers. The liquid flowing downwardly within the chamber is subjected to the action of compressed air in finely dispersed form supplied by the nozzle 3. The air is forced against the liquid in a direction opposite to that of the flow of the liquid and thus tends to promote the agglomeration of the particles suspended in the liquid. The bottom of each of the chambers 1 to 1c has a V-shaped form 4 which at its lowest point has a discharge valve 5. These V-shaped bottoms are provided for the settling and discharge of agglomerated particles from the respective chambers. The chambers are separated from each other by means of shafts 6. These shafts are comparatively narrow and the interior of each is provided with two rows of baffle plates 7 on opposite faces thereof. These baffle plates are integrally connected to the side-walls of the shafts 6 and extend downwardly at an oblique angle, thus forming pockets 8 in the shaft 6. In order to pass the liquid from the first chamber to the second chamber and so on, it is necessary to force it through the shaft 6 in an upward direction. Owing to the small width of the shafts 6 and because of the baffle plates 7 being arranged in opposite and staggered relation with respect to each other, which prevents the free upward passage of the liquid, the liquid is forced upwardly through the shaft in a zigzag-like path and at a comparatively rapid rate of speed. This speedily upward passage of the liquid and the arrangement of the baffle plates 7 slantingly downward and against the direction of flow of the liquid, together with the pockets 8 in which the liquid is caused to whirl, further promote the agglomeration of the particles suspended in the liquid. The baffle plates may even cause any agglomerated particles of sufficient size to fall downwardly into the V-shaped bottom 4. The liquid then passes through chambers 1a, 1b and 1c and connecting shafts 6 in the same manner as described with respect to chamber 1. This continued movement is brought about because of the fact that the outlet from each chamber is slightly lower than its inlet so that each chamber is first filled and then overflows into the next adjacent one. As shown in the drawing the outlet of each chamber constitutes the inlet of the next adjacent one. Following the passage of the liquid through the baffled shaft 6 of chamber 1c it is led through the overflow 9 and enters into the chamber 10 in which it flows slowly downwardly. The chamber 10 has a V-shaped bottom 11 provided with discharge valve 29. To the chamber 10 is connected an auxiliary chamber 13; these chambers being divided from each other by the partition 12. Since the partition 12 does not extend over the entire length of the chambers, the clearance below the lower end of the partition 12 permits communication of chamber 10 with auxiliary chamber 13.

Arranged within the auxiliary chamber 13 and secured to the top plate thereof is a filter 14 which consists of a perforated pipe 15 having its lower free end closed. The pipe 15 is surrounded by a bag-like filter cloth 16. Connected to the outside of the top plate of the auxiliary chamber 13 and arranged co-axially with respect to the filter 14 is a syphon pipe 17 leading into a collecting vat 18. The liquid which enters the auxiliary chamber 13 through the clearance formed between the lower end of the partition 12 and the surface of the V-shaped bottom 11 passes upwardly within the chamber 13 and through the filter 14. As soon as the auxiliary chamber 13 is filled with liquid, the liquid, subsequent to the passage through the filter 14, flows through the syphon pipe 17 and into the collecting vat 18. Thus all of the liquid prior to discharge from the auxiliary chamber 13 must pass through the filter 14 whereby the remaining suspensions in the liquid are filtered.

The present invention also includes means for the removal of deposits accumulated on the filter cloth 16, whenever this is desired. This is accomplished through a reversal of the liquid flow in the filter 14 as is described in the following. The syphon pipe 17 is connected to a stand-pipe 19 by means of a plurality of cross-pipes 20, 21 and 22; the stand-pipe 19 having an open free end 19a. These cross-pipes are arranged at different elevations and are each provided with a valve 23, 24 and 25, respectively. This arrangement makes it possible to vary the degree of discharge of the communicating chamber system 10 and 13 as will be explained in the following. Liquid is introduced into the chamber 10 until it is filled up to the edge of the over-flow 9. At this moment the liquid from the auxiliary chamber 13 begins to empty into the vat 18 by means of the syphon pipe 17, due to the fact that the upper edge of overflow 9 lies in a horizontal plane above the highest point of pipe 17. Due to the syphoning action of the latter the discharge of the liquid continues until the liquid level in chamber 10 falls below the lower edge of partition 12, provided that the valves 23, 24 and 25 in the cross-pipes 20, 21 and 22 are all closed so as to prevent air from entering into the syphon pipe 17 and break the syphon. If, however, one of these valves is open, for example, valve 23 in cross-pipe 20, which would allow the liquid to also flow into the stand-pipe 19, the syphon pipe 17 will empty the chamber 10 and the stand-pipe 19 to a height equal to that of the cross-pipe 20. At this moment air is introduced through the stand-pipe 19 and cross-pipe 20 into the syphon pipe 17, and as a result the syphoning action is interrupted. Consequently all of the liquid in the upper part of the auxiliary chamber 13 and in the interior of the filter 14 will flow backward, and the liquid levels in the communicating chambers 10 and 13 will adjust themselves to the same height as that of the open cross-pipe 20. Since the liquid thus flows through the filter 14 in the reversed direction, any particles adhering to the filter cloth 16 will be rinsed off and fall down into the V-shaped bottom 11.

If it is desired to utilize a larger portion or the entire length of the filtering surface, a valve positioned lower than valve 23 is opened. For example, the cross-pipe 22 is positioned at a height which is below the lower edge of the filter 14. If the valve of this pipe is opened, the liquid level in the chamber 13 after discharge will be below the lower edge of the filter 14 and thus the entire length of the filter cloth 16 will be rinsed off by the back-flowing liquid.

In Fig. 2 is illustrated a modified form of the connection of the stand-pipe and the syphon pipe. In this instance the stand-pipe is of U-like construction consisting of two narrow pipes 26 and 27 connected with each other by cross-pipes 20 and 21 having valves 23 and 24, respectively, and joining each other at the lower end by means of valve 25. The upper end of pipe 27 is connected to the syphon pipe 17 at its culmination point as indicated at 28. The operation of the structure shown in Fig. 2 is similar to that explained with respect to Fig. 1. With this arrangement a more effective interruption of the syphoning action is obtained.

It should be understood that it is not desired to limit the invention to the exact details of construction and operation herein shown and described, for various modifications within the scope of the appended claims may occur to persons skilled in the art.

Having thus described the invention as required by the patent statutes, what is claimed is:

1. Apparatus for the separation of suspended sulphur particles from a liquid comprising, a plurality of chambers each having an inlet opening and an outlet opening near the top thereof, means vertically dividing each chamber into a zone of large cross-sectional area and a zone of small cross-sectional area, said means extending from above the openings near the top of the chamber to a point near the bottom thereof, the inlet opening communicating with the zone of large cross-sectional area and the outlet opening leading from the zone of small cross-sectional area, the two zones intercommunicating near the bottom of each chamber below said vertical dividing means, a plurality of baffles in each zone of small cross-sectional area, the outlet opening of each chamber being at a lower level than its inlet opening and communicating with the inlet opening of the next adjacent chamber, the inlet openings of succeeding chambers being on the same level as the outlet openings of preceding ones to cause gravitational flow from one chamber to the other, and means in the path of gravitational flow from the last zone of small cross-sectional area for filtering any particles not agglomerated in the chambers.

2. In apparatus as claimed in claim 1 in which the bottom of each chamber is of substantially reduced cross-section to provide a collection zone for solid material agglomerated in the two treatment zones, the reduction in cross-section commencing below the bottom of the means dividing each chamber, and valve means for draining the solid material from the bottom of each chamber.

3. Apparatus for the separation of suspended sulphur particles from a liquid comprising, a plurality of chambers each having an inlet opening and an outlet opening near the top thereof, means vertically dividing each chamber into a zone of large cross-sectional area and a zone of small cross-sectional area, said means extending from above the openings near the top of the chamber to a point near the bottom thereof, the inlet opening communicating with the zone of large cross-sectional area and the outlet opening leading from the zone of small cross-sectional area, the two zones intercommunicating near the bottom of each chamber below said vertical dividing means, a plurality of baffles in each zone of small cross-sectional area, the outlet opening of each chamber being at a lower level than its inlet opening and communicating with the inlet opening of the next adjacent chamber, the inlet openings of succeeding chambers being on the same level as the outlet openings of preceding ones to cause gravitational flow from one chamber to the other, means in the path of gravitational flow from the last zone of small cross-sectional area for filtering any particles not agglomerated in the chambers, and means for reversing the flow through said filter to cleanse the same.

4. A process for the purification of liquids containing suspended sulphur particles comprising, maintaining a constant head of liquid to be purified, gravitationally flowing said liquid through alternate zones of relatively large and relatively small cross-sectional area to alternately change the rate of flow, bubbling a gaseous medium in counter-current to the flow of liquid in the zones of relatively large cross-sectional area where the flow is relatively slow, deflecting the liquid from one side to the other in its passage through the zones of rapid flow to further agglomeration of suspended particles, and filtering out the non-agglomerated particles after passage of the liquid through said zones.

ALFRED MAXTON.